United States Patent [19]

MacCready

[11] 4,307,865
[45] Dec. 29, 1981

[54] UNIVERSAL TRACTOR SEAT
[75] Inventor: Willis MacCready, Jackson, Mich.
[73] Assignee: Michigan Seat Company, Jackson, Mich.
[21] Appl. No.: 123,002
[22] Filed: Feb. 20, 1980
[51] Int. Cl.³ ............................................. F16M 13/00
[52] U.S. Cl. .................................. 248/424; 248/558; 297/313
[58] Field of Search ...................... 248/558, 424, 371; 297/313; 403/4; 16/129; 52/633, 634

[56] References Cited
U.S. PATENT DOCUMENTS

| 1,348,569 | 8/1920 | Knights | 248/371 |
|---|---|---|---|
| 3,003,600 | 10/1961 | MacKenzie | 403/4 X |
| 4,035,093 | 7/1977 | Redshaw | 16/129 X |
| 4,220,308 | 9/1980 | Strien et al. | 248/424 |

FOREIGN PATENT DOCUMENTS

| 490169 | 11/1918 | France | 403/4 |
|---|---|---|---|
| 340035 | 9/1959 | Switzerland | 52/633 |

Primary Examiner—James T. McCall
Attorney, Agent, or Firm—Beaman & Beaman

[57] ABSTRACT

Seat mounting apparatus, especially for use with tractors and similar vehicles, utilizing a seat supporting mounting plate and support arms adjustably affixed thereto wherein elongated slots defined on the mounting plate permit the arms to be selectively positioned and affixed to the plate in a wide variety of patterns permitting the plate and associated seat to be readily mounted upon a wide variety of vehicles without requiring modification to the vehicle or machining of the plate or seat structure.

3 Claims, 4 Drawing Figures

UNIVERSAL TRACTOR SEAT

BACKGROUND OF THE INVENTION

Tractor type vehicles including tractors of the small garden type variety and larger agricultural units, lift trucks, backhoes, heavy construction equipment, and the like utilize operator seats which are usually cushioned consisting of foam pads encased within vinyl, fabric or suitable synthetic material, and such seats are often pivotal in a forward direction to permit the unoccupied seat to remain relatively dry in inclement weather. The mounting of the seat on the vehicle is usually accomplished by bolts extending through a seat mounting plate or bracket threaded into vehicle seat supporting pads or brackets, and such pads, brackets or surfaces are often an integral part of the vehicle transmission or differential casing.

As the location of the seat supporting pads and threaded holes is considered of secondary importance with respect to the vehicle construction the location of the seat supporting apparatus will vary between manufacturers of such equipment, and the seat supporting pads, holes and brackets for various models of vehicles manufactured by the same company will usually vary.

The seats of tractors and other equipment exposed to the weather are subjected to heavy use and adverse conditions, and often require replacement. Because of the differences in types of seat mountings the replacement of seats is troublesome as the dealer is usually unable to stock the wide variety of seats necessary to cover his entire line of tractor models and considerable delays are often encountered in the ordering and shipping of particular seats.

In order to alleviate the aforementioned inventory and mounting problems attempts have been made to devise seat mounting brackets which are usable with a wide variety of vehicle models and configurations, and while some success has been experienced in this area, heretofore, seat mounting structure which is substantially "universal" has not been available.

It is an object of the invention to provide a substantially universally mountable seat for tractors and the like which is capable of sufficient adjustment and versatility to permit mounting thereof upon a wide variety of tractor vehicles.

It is a further object of the invention to provide a universally mountable tractor seat which is of relatively economical construction, and wherein the use and assembly thereof does not require special skills.

An additional object of the invention is to provide universally mountable tractor seat apparatus permitting mounting upon a wide variety of vehicles wherein no machining modification of the mounting structure is necessary, and merely the locating of and tightening of threaded bolts is required to mount the seat.

In the practice of the invention the seat mounting apparatus includes a generally planar plate in which a plurality of elongated slots are defined for receiving threaded bolts wherein a plurality of arms may be adjustably mounted to the plate. The arms include elongated slots whereby tractor mounting bolts may extend therethrough to affix the arms and plate to the vehicle. Seat apparatus is pivotally mounted upon the plate, and, usually, seat bumpers, tie-down brackets, or other seat related structure is also mounted upon the plate.

The plate slots are of an elongated configuration, and preferably, are in the form of a cross wherein the slots intersect each other at their central regions in a perpendicular manner. The slots defined in the arms are also elongated, and, preferably, four arms are associated with the plate whereby the arms may be angularly related to each other to permit alignment with the tractor mounting pads and threaded holes for receiving the mounting bolts. Bolts inserted through the arm's slots and the plate slots permit a variety of angular relationships between the arms and plate to be achieved, and the elongated configuration of the arm slots for receiving the mounting bolts also produces an additional element of adjustability to accommodate the seat apparatus to the vehicle. Usually, two arms will be mounted on each side of the plate, and the arms are generally associated as overlapped pairs, one of the arms employing an offset to produce uniform horizontal orientation of the arms.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT.

Figure 1:
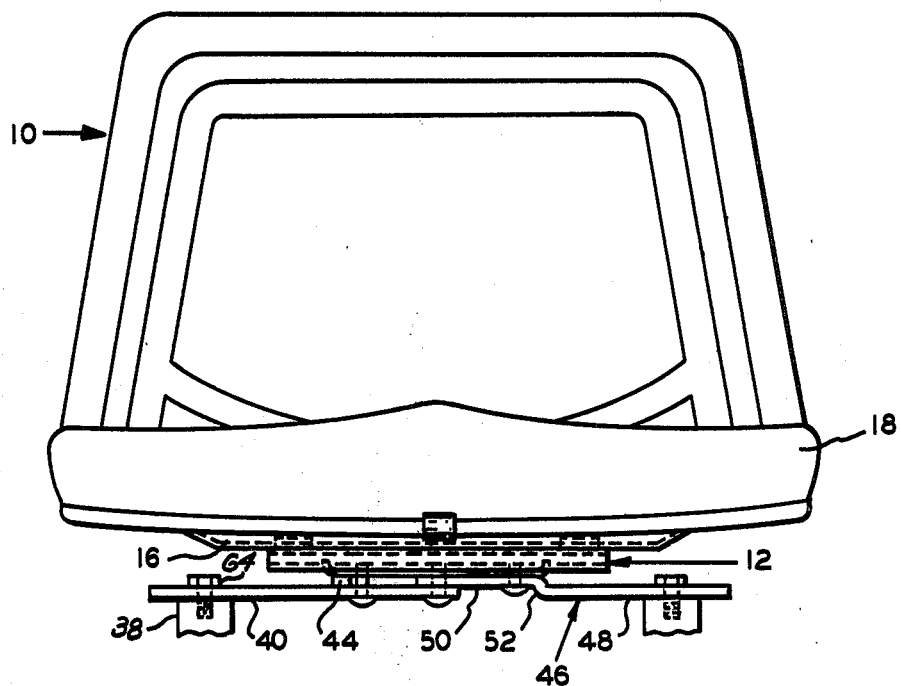
FIG. 1 is a front, elevational view of the seat apparatus of the invention.
Figure 2:
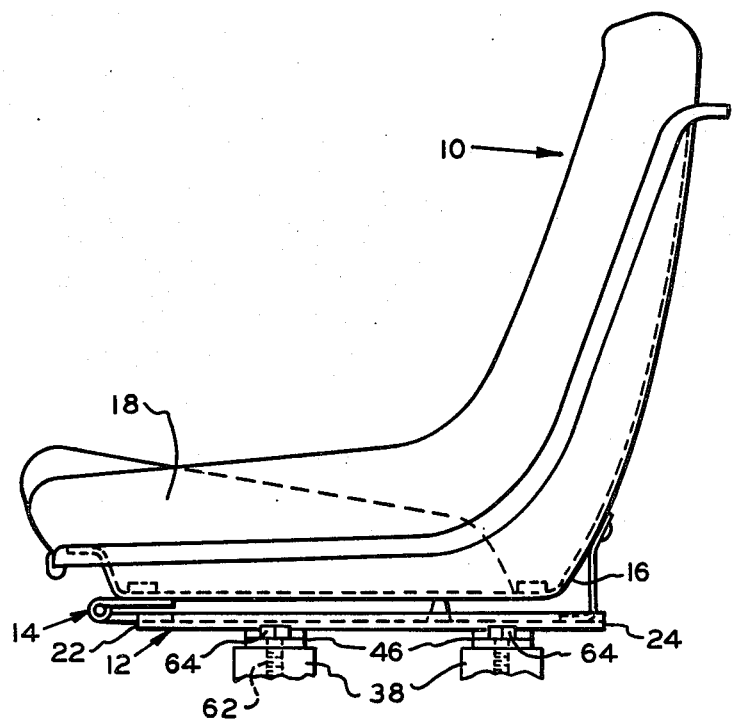
FIG. 2 is a side elevational view of seat apparatus in accord with the invention, the seat being in the normal position.

The basic assembly of seat apparatus in accord with the invention will be appreciated from FIGS. 1 and 2. The seat 10 is supported upon a mounting plate 12 by means of a hinge 14 interposed between the forward edge of the mounting plate and the forward edge of the seat. The particular seat construction does not constitute a part of the instant invention, and such seat may be of conventional construction utilizing a lower plate 16 upon which a cushion 18, usually of a resilient foam material is covered by vinyl or other synthetic waterproof material. The hinge 14 is attached to the lower plate 16 adjacent the forward edge of the lower seat portion whereby the seat may be tilted forward for protection from rain, as is conventional with tractors and construction equipment.

Figure 3:
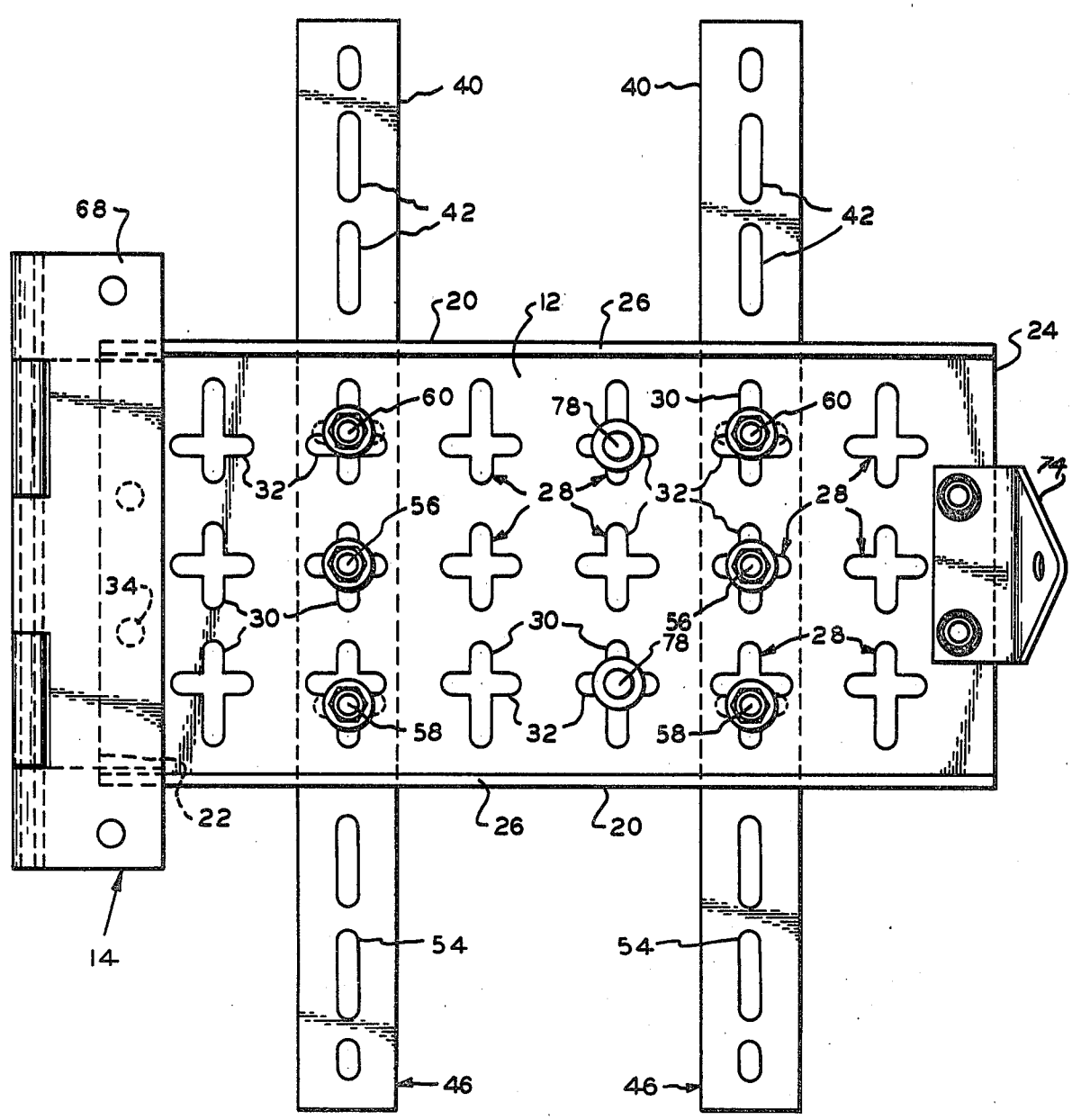
FIG. 3 is a top plan view of the mounting plate, arms and seat hinge, the seat not being illustrated.

The mounting plate 12 is best illustrated in FIG. 3, and consists of a plate of generally planar configuration and of rectangular form including parallel lateral sides 20, a front edge 22, and a rear edge 24. The lateral sides 20 are turned upwardly, FIG. 2, to form reinforcing flanges 26.

A plurality of bolt receiving openings 28 are defined in the plate 12, and such openings are in the form of intersecting elongated slots. For instance, slots 30 are disposed parallel to the front and rear edges, while the length of slots 32 are substantially parallel to the lateral sides 20. The slots forming each opening intersect each other at the central region of the associated intersected slot as to define crosses, and as will be appreciated from FIG. 3 a symmetrical cross configuration is formed in the central row of openings 28, while the rows adjacent the lateral sides 20 include openings of asymmetrical form. Holes 34 are defined in the plate adjacent the front edge 22, and holes 36 located adjacent the rear edge 24 are often used for seat associated structure, as desired.

The plate 12 is mounted upon the tractor structure, such as mounting pads 38, FIG. 2, by elongated arms. The elongated arms are of two types of configuration. Arms 40 are planar in the arm length, and a spacer 44 is welded to the upper side of the arm, FIGS. 2 and 4, which is of a vertical dimension equal to the vertical thickness of the arms 46.

The arms 46 include planar portions 48 and 50 interconnected by the offset portion 52, FIG. 1, and both the portions 48 and 50 include a plurality of elongated slots 54 defined therein.

In most instances, the arms 40 and 46 are utilized in pairs, such as shown in the drawings. For instance, the arms 40 extend beyond one plate lateral side 20, while the arms 46 extend from the opposite lateral side. A central mounting bolt 56 extends through an arm 40 and an arm portion 50 for reception within a central plate opening 28. An additional bolt 58 extends through an opening 28 and a slot in arm portion 50, while a bolt 60 extends through an opening 28 and a slot within arm 40. Thus, as will be appreciated from the drawings, the presence of the offset 52, and the spacer block 44 will locate the lower surfaces of the arms 40 and 46 on a common horizontal plane, and the arms are adjusted to rest upon the upper surface of the tractor mounting pads 38. Each of the pads 38 includes a threaded hole 62 for receiving a bolt 64 which extends through an arm slot and serves to mount each arm upon a tractor seat pad.

In the illustrated mounting of the arms 40 and 46 the central bolts 56 may serve as a pivot prior to the inserting of the bolts 58 and 60 into the arms and plate openings, and the arms mounted upon a common bolt 56 may be pivoted about the bolt 56 in any angular orientation to the plate 12 as desired. The cross configuration of the openings 28 permits considerable adjustment of the arms relative to the plate, and merely by locating the bolts 58 and 60 in desired openings an infinite number of positions of the arms relative to the plate 12 may be readily achieved. If desired, each of the arms may be attached to the underside of the plate 12 in a separate manner, i.e., not physically associated with other arms, and in such instance washers may be used as spacers with the central bolts 56 to horizontally position the arms.

Figure 4:
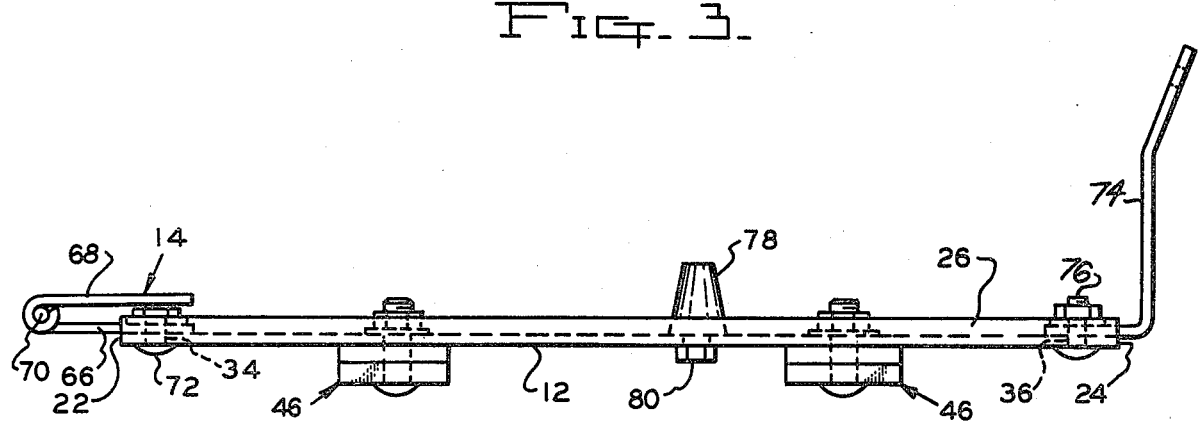
FIG. 4 is a side elevational view of the structure of FIG. 3.

The hinge 14 includes portions 66 and 68 interconnected by pivot pin 70, and the lower portion 66 is bolted to the plate 12 adjacent the front edge 22 by bolts 72, FIG. 4, extending through holes 34. Bolts extending from the seat lower plate 16 attach the hinge portion 68 to the seat to mount the seat 10 upon the mounting plate.

Some seats employ a tie-down arrangement, and if desired, a tie-down bracket 74 such as shown in FIGS. 3 and 4 may be bolted to the plate adjacent the rear edge 24 by bolts 76 extending through holes 36. Also, seat bumpers 78 are often employed to engage the seat lower plate 16, and such bumpers may be readily attached to the upper surface of the mounting plate 12 by bolts 80 extending through openings 28, as shown in FIG. 4.

In that the arms 40 and 46 may be affixed to the mounting plate 12 in an infinite number of positions, the aforedescribed seat mounting structure is substantially "universal" in its use, and by using seat apparatus in accord with the invention a single seat may be maintained in inventory by dealers which is usable with many makes of tractors and various tractor models.

It is appreciated that various modifications to the inventive concepts may be apparent to those skilled in the art without departing from the spirit and scope of the invention.

I claim:

1. A universal seat mounting bracket comprising, in combination, a single plate of generally planar configuration having upper and lower surfaces, lateral sides and front and rear edges, a plurality of slots defined in said plate intersecting said upper and lower surfaces, said slots including first portions extending substantially parallel to said lateral sides and second portions extending substantially perpendicular to said first portions defining a cross configuration wherein said first and second portions each include central regions and said portions intersect each other at said central regions, a plurality of elongated arms each having elongated slots defined therein extending in the direction of the length of said arms, threaded bolts extending through selected plate slots and arm's slots mounting said arms upon said plate lower surface in a predetermined relation thereto wherein said arms extend beyond said plate's lateral sides, and hinged seat mounting means defined on said plate adjacent said front edge.

2. In a universal seat mounting bracket as in claim 1, said lateral sides including flanged edges transversely disposed to the general plane of said slots.

3. In a universal seat mounting bracket as in claim 1, said arms comprising first and second pairs, each pair including an arm having a vertical step defined therein forming an arm supporting surface and the other arm of the pair having a vertical dimension substantially equal to the dimension of the vertical step and mounted upon said arm supporting surface of the associated pair arm.

* * * * *